United States Patent [19]

Uchiyama et al.

[11] Patent Number: 5,620,766
[45] Date of Patent: Apr. 15, 1997

[54] MAGNETO-OPTICAL DISK

[75] Inventors: Kenji Uchiyama; Masanori Shibahara; Michiki Naganawa, all of Nagano, Japan

[73] Assignee: TDK Corporation, Tokyo, Japan

[21] Appl. No.: 458,467

[22] Filed: Jun. 2, 1995

Related U.S. Application Data

[63] Continuation of Ser. No. 69,385, Jun. 1, 1993, abandoned.

[30] Foreign Application Priority Data

Jun. 29, 1992 [JP] Japan .................................. 4-194745
Oct. 21, 1992 [JP] Japan .................................. 4-307664

[51] Int. Cl.$^6$ ............................................... G11B 5/66
[52] U.S. Cl. .................. 428/64.3; 428/64.4; 428/64.6;
428/694 ML; 428/694 SG; 428/900; 369/13;
369/277; 369/283; 369/286
[58] Field of Search .................. 428/694 ML, 694 SG,
428/64.3, 64.4, 64.6, 900; 369/13, 277,
283, 286

[56] References Cited

U.S. PATENT DOCUMENTS

| | | | |
|---|---|---|---|
| 4,852,076 | 7/1989 | Ohta et al. | 369/275.4 |
| 4,990,388 | 2/1991 | Hamada et al. | 346/135.1 |
| 5,161,150 | 11/1992 | Namba et al. | 369/275.4 |
| 5,244,706 | 9/1993 | Hirata et al. | 428/64.8 |
| 5,244,774 | 9/1993 | Usami et al. | 430/270.14 |

*Primary Examiner*—Leszek Kiliman
*Attorney, Agent, or Firm*—Watson Cole Stevens Davis, PLLC

[57] ABSTRACT

A magneto-optical disc includes a pit forming region and a groove forming region on a surface of a substrate and a recording layer covering the pit and groove forming regions. The pit forming region includes a row of pits having a width of 0.40–0.55 μm and a depth of 600–900 Å and the groove forming region includes a spiral groove having a width of 0.95–1.15 μm and a depth of 600–900 Å. The disc is recorded and read by using an optical head with an objective lens having a numerical aperture of 0.40 to 0.50 and directing linearly polarized laser light having a wavelength of 600 to 900 nm to the disc such that its electric field vector has a direction perpendicular to the groove and the pit row. Tracking, seeking and information retrieval can be done with minimal errors using the same laser light beam in both the pit and groove forming regions.

6 Claims, 2 Drawing Sheets

MAGNETO-OPTICAL DISK

This application is a File Wrapper Continuation Application of application Ser. No. 08/069,385, filed 1 Jun. 1993, now abandoned.

This invention relates to a magneto-optical disc having pits and a groove in a substrate surface.

BACKGROUND OF THE INVENTION

Magneto-optical discs have a magneto-optical recording layer on a grooved substrate. On recording and reading, tracking control signals and focus control signals are detected in terms of the magnitude of reflected light from the disc surface.

In pre-formatted magneto-optical discs, some bits of information are previously recorded as pits in a lead-in or lead-out area in addition to the groove, the pre-recorded information including information for allowing the hardware to operate the disc under optimum conditions and discrete value information in the form of pulse signals of a predetermined period. Therefore, the pre-formatted magneto-optical disc includes both a region where pits are formed and a region where a groove is formed.

In these magneto-optical discs, since such operation as tracking servo, seek servo and pit information retrieval is carried out by means of an optical system using the same laser light in the pit and groove forming regions, the sizes of pits and groove must be optimized for the optical system in order to prevent occurrence of errors in the servo systems and pit information retrieval.

SUMMARY OF THE INVENTION

An object of the present invention is to provide a novel and improved magneto-optical disc which allows such operation as tracking, seeking and information retrieval to be carried out with minimal errors by means of an optical system using the same laser light in both pit and groove forming regions.

The present invention provides a magneto-optical disc comprising a substrate having a pit forming region and a groove forming region on a surface thereof, and a recording layer covering the pit and groove forming regions. A row of pits having a width of 0.40 to 0.55 μm and a depth of 600 to 900 Å are formed in the pit forming region and a groove, typically a spiral groove, having a width of 0.95 to 1.15 μm and a depth of 600 to 900 Å is formed in the groove forming region. Recording and reading operation is carried out using an optical head having an objective lens having a numerical aperture NA of 0.40 to 0.50 and linearly polarized laser light having a wavelength of 600 to 900 nm and an electric field vector in a direction perpendicular to the groove and the row of pits.

In one preferred embodiment wherein an optical head having an objective lens having a numerical aperture NA of 0.40 to 0.50 is used and linearly polarized laser light having a wavelength of 600 to 900 nm is directed to the disc such that its electric field vector has a direction perpendicular to the groove and the pit row, the disc meets the following requirements:

$I_3/I_{top} > 0.10$ and $0.3 \leq I_{11}/I_{top} \leq 0.6$ wherein $I_{top}$ is the maximum level, $I_3$ is the amplitude of a 3T signal and $I_{11}$ is the amplitude of a 11T signal in an eye pattern of the pit forming region, and $-0.20 < Asy < 0.20$ wherein Asy is the ratio of the distance between the amplitude center position of 3T signal and the amplitude center position of 11T signal to $I_{11}$. In the pit forming region, the push-pull signal level is 0.04 to 0.15 and the radial contrast is 0.15 to 0.35. In the groove forming region, the push-pull signal level is 0.10 to 0.25 and the radial contrast is 0.20 to 0.40.

Since the pits having pre-format information recorded therein and the groove for tracking servo operation are sized as defined above, the magneto-optical disc of the present invention allows an optical system to carry out such operation as tracking, seeking and information retrieval with minimal errors.

DETAILED DESCRIPTION OF THE INVENTION

The magneto-optical disc of the present invention includes a substrate and a recording layer on a surface thereof. The substrate surface includes a pit forming region and a groove forming region. The recording layer covers the pit and groove forming regions.

The pit forming region is located in a lead-in or lead-out area. The pit forming region includes a row of pits bearing bits of information as previously mentioned and serving for tracking too.

The groove forming region typically includes a spiral groove serving for tracking of recording and reading light. The groove, when wobbled, can also serve to control the rotation (rpm) of the disc. The groove may further bear time information and address information.

According to the present invention, a row of pits having a width of 0.40 to 0.55 μm and a depth of 600 to 900 Å are formed in the pit forming region and a groove having a width of 0.95 to 1.15 μm and a depth of 600 to 900 Å is formed in the groove forming region. The term pit or groove width is a half-value width which is the width at a position corresponding to ½ of the depth of the pit or groove. These sizes are measurements by a scanning tunnel microscope (STM) for the depth and a scanning electron microscope (SEM) for the width.

The magneto-optical disc of the present invention is recorded and read using a drive unit including an optical head having an objective lens having a numerical aperture NA of 0.40 to 0.50, preferably 0.44 to 0.46. The recording and reading light in the form of linearly polarized laser light having a wavelength of 600 to 900 nm, preferably 770 to 790 nm is directed to the disc such that its electric field vector may be in a direction perpendicular to the groove and row of pits. In this way, data are recorded in and retrieved from the magneto-optical disc. Tracking during recording and reading is achieved by directing such laser light to the groove and row of pits. It is to be noted that the magneto-optical disc of the invention is generally designed for in-groove recording.

The magneto-optical disc of the invention has the following features when operated with the optical head and laser light as mentioned above.

Figure 1:
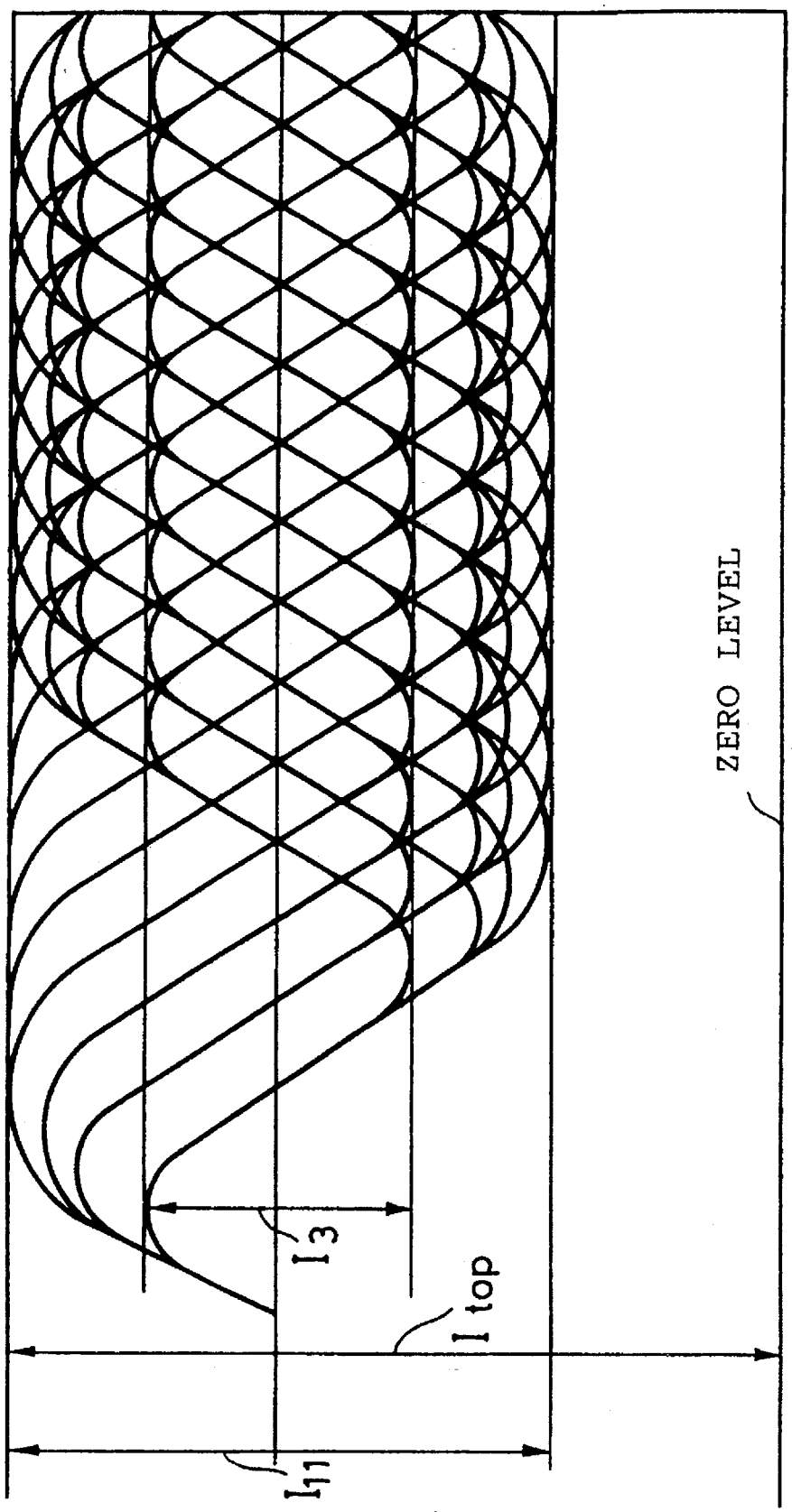
FIG. 1 is an exemplary eye pattern in the pit forming region of a magneto-optical disc.

(1) The disc meets the requirements:

$I_3/I_{top} > 0.10$, especially $I_3/I_{top} > 0.15$, and $0.3 \leq I_{11}/I_{top} \leq 0.6$ wherein $I_{top}$ is the maximum level, $I_3$ is the amplitude of a 3T signal and $I_{11}$ is the amplitude of a 11T signal in an eye pattern of the pit forming region as shown in FIG. 1. With $I_3/I_{top}$ outside the range, the drive unit would fail to read 3T signals or must accommodate a heavy load in order to ensure reading of 3T signals. With $I_{11}/I_{top}$ below the range, the drive unit would fail to read 11T signals. With $I_{11}/I_{top}$ beyond the range, read signals would sometimes be distorted in waveform due to the influence of adjacent pits, resulting in a read-out failure.

(2) The disc meets the requirement:

$-0.20 < Asy < 0.20$ wherein Asy is the ratio of the distance between the amplitude center position of 3T signal and the amplitude center position of 11T signal to $I_{11}$. If the amplitude center position of 3T signal is located below the amplitude center position of 11T signal (or on the zero-level side), Asy has a negative value. With Asy outside the range, a failure would occur in reading out 3T signals.

(3) The disc has a push-pull signal level of 0.04 to 0.15, especially 0.04 to 0.11 in the pit forming region. The push-pull signal used herein is a tracking signal used in controlling tracking by a push-pull method. The push-pull method is a method of detecting a tracking error by receiving light reflected and diffracted by the groove or pit on two light-receiving sections of a two-divided photodiode disposed symmetrical with respect to the track center, determining the difference between the outputs of the two light-receiving sections, the output difference giving the tracking error. The push-pull signal level is represented by $(I_1-I_2)/(I_1+I_2)$ wherein $I_1$ and $I_2$ are the outputs of the respective light-receiving sections. Push-pull signal levels below the range would not ensure normal tracking whereas above the range, the balance with other optical properties would be destroyed and some optical heads would produce focus servo signals containing noise.

(4) The disc has a radial contrast of 0.15 to 0.35, especially 0.15 to 0.30 in the pit forming region. The radial contrast RC in the pit forming region is represented by $RC=2|I_B-I_P|/(I_B+I_P)$ wherein a signal available through a low-pass filter has a land-derived output $I_B$ and a pit-derived output $I_P$. The number of tracks that the optical head skipped and the moving direction or polarity of the optical head can be determined from the RC output. With a radial contrast below the range, there would occur errors in track counting and polarity determination. Beyond the range, the servo system would become unstable due to disturbing noise.

(5) The disc has a push-pull signal level of 0.10 to 0.25, especially 0.11 to 0.20 and a radial contrast of 0.20 to 0.40, especially 0.20 to 0.35 in the groove forming region. The radial contrast RC in the groove forming region is represented by $RC=2|I_L-I_G|/(I_L+I_G)$ wherein a signal has a land-derived output $I_L$ and a groove-derived output $I_G$.

The components of the magneto-optical disc of the present invention other than the size of the pits and groove are not particularly limited and may be selected from those used in conventional magneto-optical discs. One preferred embodiment of the magneto-optical disc is illustrated below.

Figure 2:
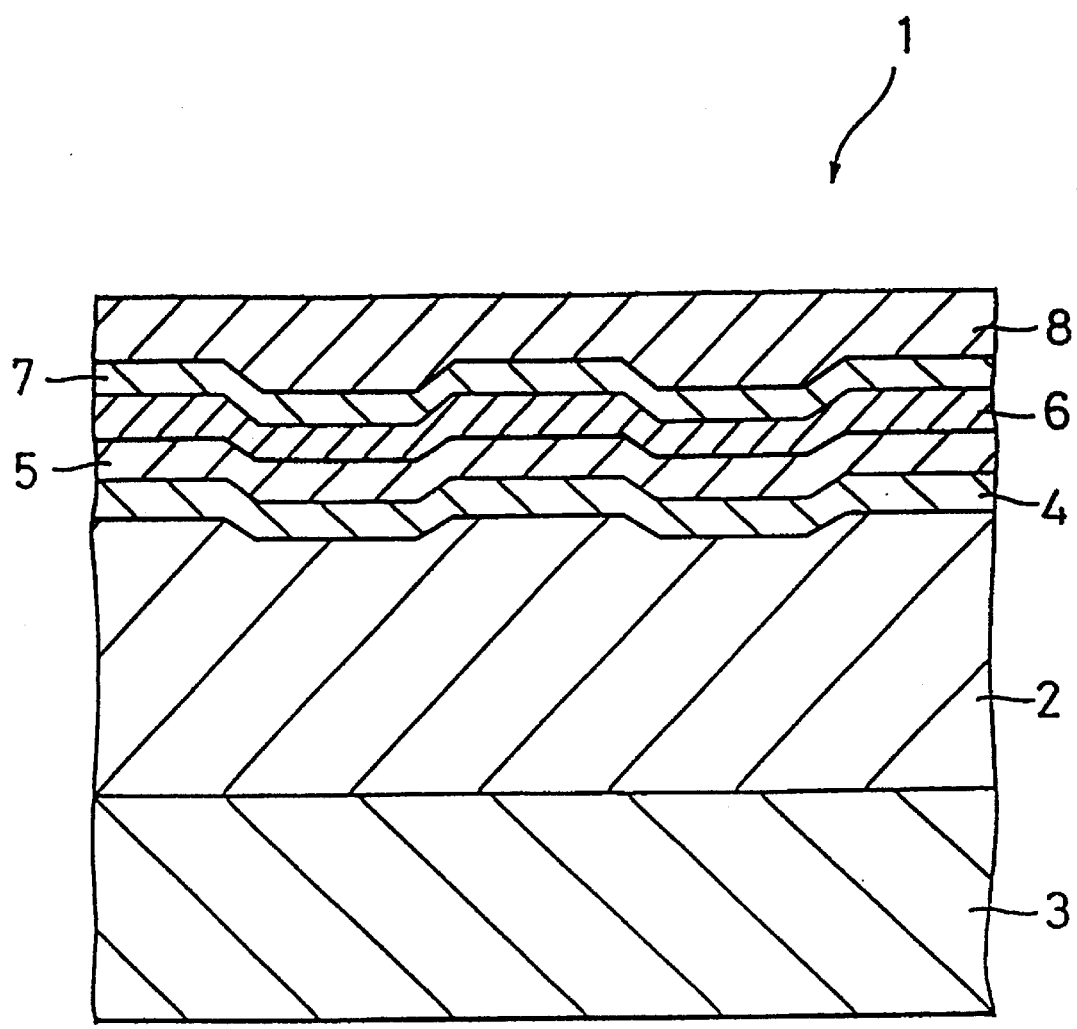
FIG. 2 is a partial cross-sectional view of an exemplary magneto-optical disc according to the present invention.

Referring to FIG. 2, there is illustrated one exemplary magneto-optical disc generally designated at 1 as comprising on one surface of a substrate 2, a first protective layer 4, a recording layer 5, a second protective layer 6, a reflective layer 7, and a protective coating 8 in the described order. For recording and reading operation, a magnetic head (not shown) cooperates with the disc on or above the protective coating 8. The operating system may be either a flying head system which the magnetic head is lifted above the disk surface due to a pneumatic lift by disc rotation or a stationary head system in which the magnetic head is spaced a fixed distance from the disk surface.

The substrate 2 is generally formed of glass or transparent resins such as polycarbonate, acrylic resins, amorphous polyolefins, and styrene resins. Such a choice is made because the magneto-optical disc of the invention is recorded and read by using an optical head positioned on the rear surface side of the substrate 2 (the lower side in FIG. 2) and directing a laser beam to the recording layer 5 through the substrate 2. The surface of the substrate 2 on which the recording layer 5 is formed is provided with a groove and pits as previously defined.

The first and second protective layers 4 and 6 are effective for improving C/N and preventing corrosion of the recording layer and generally about 10 to 150 nm thick. It is desired to provide at least one of these protective layers, most desirably both. The protective layers are formed of a dielectric material such as oxides, carbides, nitrides, sulfides and mixtures thereof by any desired gas phase deposition method such as sputtering, evaporation and ion plating.

The recording layer 5 disposed between the first and second dielectric layers 4 and 6 is one in which information can be magnetically recorded using a modulated thermal beam or modulated magnetic field and the recorded information be read through magneto-optical conversion. The recording layer 5 may be formed of any desired material which is capable of such magneto-optical recording. Preferably, it is prepared by depositing an alloy containing a rare earth metal element, especially a rare earth metal-transition metal alloy by sputtering, evaporation or ion plating, preferably by sputtering, to form an amorphous film. Some preferred examples of the recording layer composition are TbFeCo, DyTbFeCo, NdDyFeCo, and NdGdFeCo. The recording layer is generally about 10 to 100 nm thick.

The reflective layer 7 is optionally disposed on the second dielectric layer 6 and formed of any of relatively high reflectivity metal materials which include Au, Ag, Pt, Al, Ti, Cr, Ni and Co and alloys or compounds thereof. The reflective layer may be formed in a similar manner to the recording layer 5. The reflective layer is generally about 30 to 200 nm thick.

The protective coating 8 is optional and provided for protecting the underlying sputtered layers from the first protective layer 4 to the reflective layer 7. The protective coating 8 is preferably formed of a radiation curable resin. More particularly, the coating is made of a material obtained by radiation curing a radiation curable compound or a polymerizable composition thereof. Illustrative are monomers, oligomers and polymers having contained or incorporated in their molecule groups capable of crosslinking or polymerizing upon exposure to radiation, for example, acrylic double bonds as given by acrylic and methacrylic acids and esters thereof having an unsaturated double bond sensitive to ionization energy and capable of radical polymerization, allyl double bonds as given by diallyl phthalate, and unsaturated bonds as given by maleic acid and maleic derivatives. They are preferably polyfunctional, especially trifunctional or more and used alone or in admixture of two or more.

The radiation curable monomers and oligomers used herein preferably have a molecular weight of less than 2,000 and 2,000 to 10,000, respectively. Examples include styrene, ethyl acrylate, ethylene glycol diacrylate, ethylene glycol dimethacrylate, diethylene glycol diacrylate, diethylene glycol methacrylate, 1,6-hexane glycol diacrylate, and 1,6-hexane glycol dimethacrylate while preferred examples include pentaerythritol tetraacrylate (or methacrylate), pentaerythritol acrylate (or methacrylate), trimethylolpropane triacrylate (or methacrylate), trimethylolpropane diacrylate (or methacrylate), acryl-modified urethane elastomers, and derivatives of these having a functional group such as COOH incorporated therein, phenol ethylene oxide adduct acrylate (or methacrylate), compounds in which an acryl or methacryl group or ε-caprolactone acryl group attached to a pentaerythritol fused ring as disclosed in Japanese Patent Application No. 72888/1987, and acryl group-containing monomers and oligomers such as special acrylates as disclosed in Japanese Patent Application No. 72888/1987. Other useful radiation curable oligomers are acryl-modified ones of oligoester acrylate and urethane elastomers and derivatives of these having a functional group such as COOH incorporated therein.

In addition to or instead of the above-mentioned compound, there may be used radiation curable compounds obtained by modifying thermoplastic resin to be radiation sensitive. Exemplary radiation curable resins are thermoplastic resins containing or having incorporated in a molecule thereof a group capable of crosslinking or polymerizing upon exposure to radiation, for example, a acrylic double bond as given by acrylic acid, methacrylic acid and esters thereof having an unsaturated double bond capable of radical polymerization, an allyl double bond as given by diallyl phthalate, and an unsaturated bond as given by maleic acid and maleic derivatives. Examples of the thermoplastic resins which can be modified to be radiation curable include vinyl chloride copolymers, saturated polyester resins, polyvinyl alcohol resins, epoxy resins, phenoxy resins, and cellulosic derivatives. Other resins which can be modified to be radiation curable include polyfunctional polyester resins, polyether ester resins, polyvinyl pyrrolidone resin and derivatives (PVP-olefin copolymers), polyamide resins, polyimide resins, phenolic resins, spiro-acetal resins, and acrylic resins containing at least an acrylate and methacrylate having a hydroxyl group as a polymerizable component.

A polymerizable coating composition is cured with radiation, typically ultraviolet radiation and a photo-polymerization initiator or sensitizer is preferably contained in the composition. The photo-polymerization initiator or sensitizer used herein is not critical and may be selected from conventional ones such as acetophenones, benzoins, benzophenones, and thioxanthoins. A mixture of initiators and/ or sensitizers is also useful. The composition may contain about 0.5 to 5% by weight of the initiator or sensitizer. The polymerizable composition may be synthesized by a conventional method or prepared by mixing commercially available compounds.

Another composition containing a radiation curable compound from which the protective coating can be formed is one containing an epoxy resin and a cationic photo-polymerization catalyst. Epoxy resins are preferably alicyclic epoxy resins, especially those having two or more epoxy groups in a molecule. Exemplary alicyclic epoxy resins are 3,4-epoxycyclohexylmethyl-3,4-epoxycyclohexane carboxylate, bis(3,4-epoxycyclohexylmethyl)adipate, bis(3,4-epoxycyclohexyl)adipate, 2-(3,4-epoxycyclohexyl-5,5-spiro-3,4-epoxy)cyclohexane-metadioxane, bis(2,3-epoxycyclopentyl) ether, vinylcyclohexene dioxide alone or in admixture. The alicyclic epoxy resins may have any desired epoxy equivalent although an epoxy equivalent of 60 to 300, especially 100 to 200 is preferred for satisfactory curability.

The cationic photo-polymerization catalyst may be selected from well-known ones. Examples include complexes of metal fluoroborate and boron trifluoride, bis(perfluoroalkylsulfonyl)methane metal salts, aryl diazonium compounds, aromatic onium salts of Group 6A elements, aromatic onium salts of Group 5A elements, dicarbonyl chelates of Group 3A to 5A elements, thiopyrilium salts, Group 6A elements having MF6 anions wherein M is P, As or Sb, triaryl sulfonium complex salts, aromatic iodonium-complex salts, and aromatic sulfonium complex salts. Preferred are polyaryl sulfonium complex salts, aromatic sulfonium or iodonium salts of halo-containing complex ions, and aromatic onium salts of Group 3A, 5A or 6A elements.

Also useful are cationic photo-polymerization catalysts containing an organometallic compound and a photo-decomposable organic silicon compound. These cationic photo-polymerization catalysts are non-strong acid systems and thus avoid any adverse effect to the corrosion-susceptible recording layer of the magneto-optical recording disc. The organometallic compounds are preferably complex compounds in which alkoxy, phenoxy, β-diketonato and similar groups are coordinated to a metal atom such as Ti, V, Cr, Mn, Fe, Co, Ni, Cu, Zn, Al, and Zr. Especially preferred are organic aluminum compounds such as trismethoxy aluminum, trispropionato aluminum, tristrifluoroacetyl aluminum, and trisethylacetoacetonato aluminum. The photo-decomposable organic silicon compounds are to form silanols upon exposure to radiation such as ultraviolet radiation. Silicon compounds having a peroxysilano, o-nitrobenzyl and α-ketosilyl group are preferred. Preferably the composition contains 0.05 to 0.7 parts, especially 0.1 to 0.5 parts by weight of the cationic photo-polymerization catalyst per 100 parts by weight of the epoxy resin.

Preferred among the aforementioned compositions is a composition containing a radiation curable compound having an acryl group and a photo-polymerization initiator or sensitizer, which is applied to form a coating and then cured with radiation, especially UV radiation.

The protective coating 8 is preferably 1 to 30 μm, especially 2 to 20 μm thick. With a thickness of less than 1 μm, it would be difficult to form a uniform film and a durability problem would arise. Too thick coatings tend to crack due to shrinkage upon curing or cause warpage of the disc.

For example, the protective coating 8 is prepared by first applying a resin, preferably a radiation curable resin composition as mentioned above to form a coating. The coating method is not critical and may be selected from well-known ones such as spin coating, screen printing, gravure coating, spray coating and dipping. Coating conditions may be properly determined by taking into account the viscosity of polymerizable composition, the desired buildup of coating and the like. Then the coating is exposed to UV radiation for curing. If desired, the coating is heated prior to UV exposure. Instead of UV, electron radiation or the like may be used. Typically, the coating is exposed to UV radiation at an intensity of about 50 mW/cm² or more and a dose of about 500 to 2,000 mJ/cm². The UV source may be a conventional one such as a mercury lamp. Upon UV exposure, the compounds undergo radical polymerization.

On the rear surface of the substrate 2 is formed a transparent hard coating 3 as shown in FIG. 2, if desired. The composition and thickness of the hard coating are the same as the protective coating 8. Preferably the hard coating 3 is rendered antistatic by adding a surfactant or the like. The hard coating may be disposed not only on the rear surface of the substrate, but also on the inner and outer peripheral edges of the disc.

EXAMPLE

Examples of the present invention are given below by way of illustration and not by way of limitation.

Magneto-optical disc samples, Nos. 101 to 105 and 201 to 205, were prepared.

There were furnished disc-shaped polycarbonate substrates having an outer diameter of 64 mm, an inner diameter of 11 mm and a recording area thickness of 1.2 mm. The substrates had a spiral row of pits and a spiral groove formed in one major surface with the size (width and depth) shown in Tables 1 and 2.

A first protective layer of SiNx was deposited on the pit and groove formed major surface of each substrate by RF magnetron sputtering to a thickness of 90 nm. A recording layer of the composition: $Tb_{23}Fe_{72}Co_5$ was then deposited on the first protective layer so as to cover the pits and groove by sputtering to a thickness of 20 nm. A second protective layer of LaSiON was then deposited on the recording layer by RF magnetron sputtering to a thickness of 20 nm. An aluminum alloy reflective layer of 80 nm and a protective coating were then provided on the second protective layer.

The protective coating was formed by spin coating a polymerizable composition comprising 50 parts by weight of an oligoester acrylate (molecular weight 5,000), 50 parts by weight of trimethylolpropane triacrylate, and 3 parts by weight of acetophenone photopolymerization initiator and exposing the coating to UV radiation in a dose of 1,000 mJ/cm² for curing. At the end of curing, the protective coating had an average thickness of about 5 μm.

In the pit and groove forming regions of the thus prepared magneto-optical disc samples, $I_{top}$, $I_3$, $I_{11}$, Asy, P-P and RC were measured as shown in Tables 1 and 2. $I_{top}$ is the maximum level, $I_3$ is the amplitude of a 3T signal and $I_{11}$ is the amplitude of a 11T signal in an eye pattern of the pit forming region as shown in FIG. 1, P-P is a push-pull signal level, and RC is a radial contrast. On measurement, a drive equipped with an objective lens having NA=0.45 is used and linearly polarized laser light having a wavelength of 780 nm was directed to the disc so that the electric field vector had a direction perpendicular to the groove and pit row.

TABLE 1

| | Pit | | | | | | |
|---|---|---|---|---|---|---|---|
| No. | Width (μm) | Depth (Å) | $I_3/I_{top}$ | $I_{11}/I_{top}$ | Asy | P-P | RC |
| 101 (comparison) | 0.46 | 548* | 0.209 | 0.297** | −0.037 | 0.071 | 0.128** |
| 102 | 0.48 | 707 | 0.315 | 0.457 | −0.060 | 0.076 | 0.182 |
| 103 | 0.50 | 855 | 0.408 | 0.579 | −0.102 | 0.063 | 0.268 |
| 104 (comparison) | 0.48 | 968* | 0.436 | 0.641** | −0.080 | 0.053 | 0.275 |
| 105 (comparison) | 0.57* | 814 | 0.337 | 0.622** | −0.135 | 0.075 | 0.246 |

*outside the range of the invention
**outside the preferred range of the invention

TABLE 2

| | Groove | | | |
|---|---|---|---|---|
| No. | Width (μm) | Depth (Å) | P-P | RC |
| 201 (comparison) | 1.00 | 551* | 0.146 | 0.136** |
| 202 | 0.99 | 719 | 0.175 | 0.220 |
| 203 | 1.03 | 840 | 0.162 | 0.321 |
| 204 (comparison) | 1.02 | 1059* | 0.100 | 0.538** |
| 205 (comparison) | 0.82* | 770 | 0.290** | 0.122** |

*outside the range of the invention
**outside the preferred range of the invention The effectiveness of the invention is evident from Tables 1 and 2.

For comparison purposes, measurements were made by using a drive equipped with an objective lens having NA=0.50 and directing circularly polarized laser light having a wavelength of 780 nm to the disc. For sample Nos. 202 and 203 in Table 2, P-P was 0.327 and 0.332 which were outside the preferred range between 0.10 and 0.25.

Although some preferred embodiments have been described, many modifications and variations may be made thereto in the light of the above teachings. It is therefore to be understood that within the scope of the appended claims, the invention may be practiced otherwise than as specifically described.

We claim:

1. A magneto-optical disc, comprising:
   a substrate having a pit forming region and a groove forming region on a surface thereof;
   a recording layer covering the pit and groove forming regions;
   a first protective layer between the substrate and the recording layer;
   a second protective layer on the recording layer; and
   a row of pits having a width of 0.40 to 0.55 μm and a depth of 600 to 900 Å formed in said pit forming region and a groove having a width of 0.95 to 1.15 μm and a depth of 600 to 900 Å formed in said groove forming region.

2. The magneto-optical disc of claim 1 having the following characteristics:

$I_3/I_{top}>0.10$ and $$0.3 < I_{11}/I_{top} < 0.6$$

wherein $I_{top}$ is the maximum level, $I_3$ is the amplitude of a 3T signal and $I_{11}$ is the amplitude of a 11T signal in an eye pattern of the pit forming region, and $$-0.20 < Asy < 0.20$$

wherein Asy is the ratio of the distance between the amplitude center position of 3T signal and the amplitude center position of 11T signal to $I_{11}$.

3. The magneto-optical disc of claim 2 wherein the pit forming region provides a push-pull signal level of 0.04 to 0.15 and a radial contrast of 0.15 to 0.35, and the groove forming region provides a push-pull signal level of 0.10 to 0.25 and a radial contrast of 0.20 to 0.40.

4. A magneto-optical recording and reading system, comprising:

a substrate having a pit forming region and a groove forming region on a surface thereof;

a recording layer covering the pit and groove forming regions;

a first protective layer between the substrate and the recording layer;

a second protective layer on the recording layer;

a row of pits having a width of 0.40 to 0.55 μm and a depth of 600 to 900 Å formed in said pit forming region and a groove having a width of 0.95 to 0.15 μm and a depth of 600 to 900 Å formed in said groove forming region; and an optical head including an objective lens having a numerical aperture of 0.40 to 0.50 and using linearly polarized laser light having a wavelength of 600 to 900 nm and said optical head forming an electric field vector in a direction perpendicular to the groove and the row of pits.

5. The magneto-optical recording and reading system of claim 4 having the following characteristics:

$$I_3/I_{top} > 0.10 \text{ and}$$

$$0.3 < I_{11}/I_{top} < 0.6$$

wherein $I_{top}$ is the maximum level, $I_3$ is the amplitude of a 3T signal and $I_{11}$ is the amplitude of a 11T signal in an eye pattern of the pit forming region, and $$-0.20 < Asy < 0.20; \text{ and}$$

wherein Asy is the ratio of the distance between the amplitude center position of 3T signal and the amplitude center position of 11T signal to $I_{11}$.

6. The magneto-optical recording and reading system of claim 5, wherein the pit forming region provides a push-pull signal level of 0.04 to 0.15 and a radial contrast of 0.15 to 0.35, and the groove forming region provides a push-pull signal of 0.10 to 0.25 and a radial contrast of 0.20 to 0.40.

* * * * *